US006335733B1

(12) United States Patent
Keren et al.

(10) Patent No.: US 6,335,733 B1
(45) Date of Patent: Jan. 1, 2002

(54) METHOD AND SYSTEM FOR DISPLAYING AND EDITING A RESOURCE SCHEDULE

(75) Inventors: Mila Keren, Nesher; Doron Cohen, Mitzpe Gilon; Avraham Harpaz, Haifa; Alan Hartman, Maifa; Mel Shalev, Kibbutz Rosh Hanikra, all of (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/082,796

(22) Filed: May 21, 1998

(51) Int. Cl.[7] .................................................. G06F 15/00
(52) U.S. Cl. .................... 345/440; 345/619; 345/635; 345/440.1; 345/440.2
(58) Field of Search ................... 345/440, 619, 345/121, 621, 625, 634, 635, 35, 661

(56) References Cited

U.S. PATENT DOCUMENTS

| 5,016,170 | * | 5/1991 | Pollalls et al. | 364/401 |
| 5,414,809 | * | 5/1995 | Hogan et al. | 395/155 |
| 5,581,678 | * | 12/1996 | Kahn | 395/140 |
| 5,659,768 | * | 8/1997 | Forbes et al. | 395/79 |
| 5,852,449 | * | 12/1998 | Esslinger et al. | 345/473 |
| 5,894,311 | * | 4/1999 | Jackson | 345/440 |
| 5,896,133 | * | 4/1999 | Lynch et al. | 345/357 |
| 5,995,113 | * | 11/1999 | Mitchell et al. | 345/440 |
| 6,073,110 | * | 6/2000 | Rhodes et al. | 705/8 |
| 6,222,530 | * | 4/2001 | Sequeira | 345/327 |

OTHER PUBLICATIONS

"IBM ECO–2000: Optimized Crew Scheduling For The Next Century", *IBM Haifa Research Laboratory*, 1–21 (1995).
"ECO–2000 User Guide", *IBM Haifa Research Laboratory*, 1.0:9–29 (1997).

* cited by examiner

*Primary Examiner*—Matthew Luu
*Assistant Examiner*—Daniel J Chung
(74) *Attorney, Agent, or Firm*—Browdy and Neimark

(57) ABSTRACT

A method and system for displaying a resource schedule containing a plurality of objects in an N-level multiple hierarchy all of which objects are subject to a common dependency, comprising the steps of allocating different non-overlapping areas of a display device for each level of the resource schedules, and graphically displaying each level of the resource schedule in the respective area of the display device in synchronized relationship on a common axis representative of the common dependency. Editing tools are provided for allowing objects of the same level to be interchanged, objects of a given level i (where i<N) to be inserted into an object of a higher level (i+1), and objects of a given level i (where i>1) to be disassembled into an object of a lower level (i−1). The method and system are particularly suited for constructing and editing crew pairings for airlines and allow simple and efficient on-line, interactive manipulation of resources.

42 Claims, 4 Drawing Sheets

METHOD AND SYSTEM FOR DISPLAYING AND EDITING A RESOURCE SCHEDULE

FIELD OF THE INVENTION

This invention relates to resource scheduling in general and, in particular, to the efficient allocation of personnel to time-related tasks.

BACKGROUND OF THE INVENTION

Resource scheduling is concerned with the optimum allocation of resources to a task in order that the task may be performed at minimum cost. Various techniques are known for aiding in this task, such as PERT charts which allow a critical path to be identified so that adequate resources can be allocated thereto in order that it can be accomplished in sufficient time to prevent adverse performance of subsequent tasks. In the, specific case of human resource scheduling, personnel are allocated to one or more tasks during defined time intervals in accordance with pre-defined rules. At their most basic, the rules allow personnel to be allocated according to their competence to perform the desired task. For example, in a factory environment a machinist must first machine a workpiece before it is assembled by a fitter. On the other hand, it is undesirable that the fitter be idle whilst the machinist is busy and, in general, this requirement is met by staggering tasks so that time-related tasks are performed in parallel as far as possible. Thus, in the relatively simple example of a factory, a fitter will assemble an already-machined workpiece whilst a subsequent workpiece is being machined. By such means, both the machinist and the fitter can work simultaneously.

There are other examples of human resource allocation where more diverse factors come into play. For example, flight scheduling allocates crews to aircraft so that a crew can complete its flight mission and return to base for another mission. Each crew normally comprises a pilot and sub-pilot together with appropriate ancillary staff such as stewards, stewardesses, and so on. It is often neither practical nor permissible to complete a round trip with the same crew, since safety considerations require that the crew rest for a specified time period after each work shift of specified duration. The aircraft itself is not subject to the same considerations and during the crew's rest period, the aircraft may be staffed by a different crews so as to complete the next leg of the journey.

Thus, in such cases, different crews must be allocated for each flight according to pre-determined time schedules, crew availability, flight duration, air-carrier regulations determining, amongst other factors, maximum permitted work shifts and minimum permitted rest periods. In order to optimize crew allocation so as to minimize the overall cost to the airline (or carrier), yet other factors may also be significant. For example, after completion of a flight mission to a particular landing point, the crew's next flight mission may not necessarily commence from that landing point. In this case, the crew must first be transported to the point of departure of their next flight mission. Whilst they are being transported in this manners the crew is idle and takes up space on the aircraft which might otherwise be used by fare-paying customers. Furthermore, it is not always possible to transport the crew to their new departure point using the crew's own carrier. For example, the carrier may not run a flight between the previous landing point and the new point of departure; or the only available flight run by the carrier may be full or may take off at an unsuitable time. For example, if it takes off too early, the crew may not have had sufficient rest. This is inadmissible according to flight regulations. On the other hand, if it takes off too late, the crew may be idle for too long. This is admissible but costly.

In either case, the crew must be transported using another carrier and this, of course, is subject to additional costs, It is therefore usually preferable wherever possible to transport crews from the landing point of one task to the take off point of a subsequent task using the crew's own carrier.

Furthermore, crews must be allocated to flights in pairs since for every outward-bound journey there must always be a return journey to base. This gives rise to what is known as "crew-pairing" and essentially dictates that the scheduler assigns each crew to both legs of the journey so as form a composite paired task. This imposes yet further limitations since it is obviously not possible to replace a crew on one leg of the journey only.

It is thus apparent that allocating human resources to such time-dependent tasks, which are subject to conflicting requirements, is usually an iterative procedure using trial and error. Often, flight schedules are plotted on a Gantt Chart, which allows time-related data to be presented so that the inter-relationship between different events may be, easily discerned. Not infrequently, last minute alterations are dictated by sudden unavailability of crew members owing, for example, to illness, jury service, army call up and so on. This may, be further complicated by a crew member suddenly becoming unfit for service after completing an outward journey but before returning to base. In either case, the affected crew member must be replaced and this requires running the whole time-consuming procedure again from scratch.

Use of a Gantt Chart for displaying the time-dependent tasks permits the tasks to be assimilated quickly in proper time-relationship. It does not, however, simplify the editing process nor in itself does it allow "crew pairings" to be easily identified and thus does not prevent inadmissible replacement of a crew member during only a single leg of the round trip.

SUMMARY OF THE INVENTION

It is an object of the invention to provide a method for allowing effective display of resource schedules wherein the above-mentioned problems are significantly reduced or eliminated.

According to a broad aspect of the invention, there is provided for use with a computer having a processor and display device coupled thereto, a method for displaying a resource schedule containing a plurality of objects in an N-level multiple hierarchy all of which objects are subject to a common dependency, comprising the steps of:
   (a) allocating different non-overlapping areas of the display device for each level of the resource schedules,
   (b) graphically displaying each level of the resource schedule in the respective area of the display device on a common axis representative of the common dependency,
   (c) providing editing tools for allowing:
      (i) objects of the same level to be interchanged,
      (ii) objects of a given level i (where i<N) to be inserted into an object of a higher level (i+1), and (iii) objects of a given level i (where i>1) to be disassembled into an object of a lower level (i−1)

According to another aspect of the invention there is provided a system having a processor coupled to a memory and a display device for displaying a resource schedule containing a plurality of objects in an N-level multiple hierarchy all of which objects are subject to a common dependency, said processor comprising:

(a) means for allocating different non-overlapping areas of the display device for each level of the resource schedules, (b) means for graphically displaying each level of the resource schedule in the respective area of the display device on a common axis representative of the common dependency, and (c) editing tools for allowing:

(i) objects of the same level to be interchanged, (ii) objects of a given level i (where i<N) to be inserted into an object of a higher level (i+1), and (iii) objects of a given level i (where i>1) to be disassembled into an object of a lower level (i−1).

Optionally, the different levels of the resource schedule are displayed is mutually synchronized relationship with respect to the common axis. In the specific case where the invention is employed for editing a Gantt Chart representative of a Crew-Pairing having three levels: Crew-Pairing, Duties and Flights, N equals 3 and three windows are provided each corresponding to one of the levels.

Such a Gantt Chart Editor finds specific application in the context of a Complete Pairing System which includes inter alia (i) the ability to load data from a database, (ii) to create a new pairings scenario, (iii) to generate an optimized solution, (iv) to fine-tune the optimized solution and (v) to present a complete solution encompassing all fleets. The invention described and claimed herein relates only to the provision of an object-oriented editor for fine-tuning the optimized solution and therefore full details of the complete system are not given. Further general information may be derived from the IBM "ECO-2000 User Guide", relevant pages of which are contained in an Appendix attached hereto.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1:
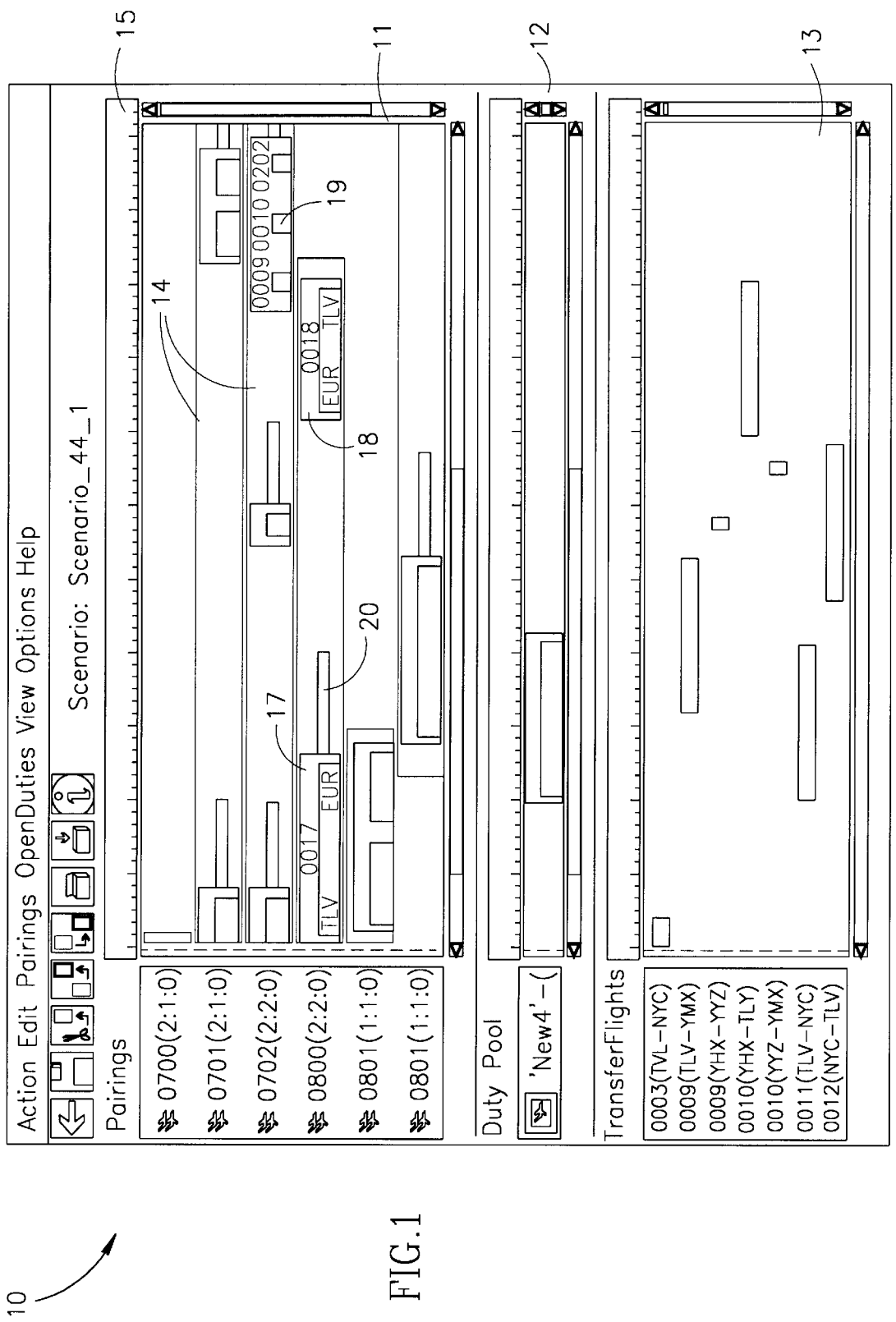
FIG. 1 is a pictorial representation of a screen is display showing editing windows associated with a crew-pairing editor according to the invention.

FIG. 1 shows pictorially a screen display of a crew-pairing schedule depicted generally as 10 comprising top level, mid-level and low-level windows 11, 12 and 13, respectively. The top-level window 11 shows crew-pairings 14 in the form of a Gantt Chart wherein the horizontal axis represents time. A ruler 15 is displayed at the top of the screen and is calibrated in suitable units. As the screen is resized the ruler 15 is automatically re-scaled so as to conform to the adjusted time frame.

Crew-pairings 14 are displayed on, different lines of the top-level window 11 and at the side thereof is displayed textual information describing the corresponding crew-pairing. Associated with each crew-pairing are two duties each comprising one or more flights with no intervening rest period. For example, associated with the crew-pairing 14 are duties 17 and 18 and labeled "0017" and "0018". Duty "0017" comprises a single flight from Tel Aviv (TLV) to Europe (EUR). The duty "0017" is an object which, once created, can be inserted into any crew-pairing as required. Duty "0018" comprises a single flight from Europe (EUR) to Tel Aviv (TLV). Thus, assuming that the crew-pairing originates in Tel Aviv, duty "0017" represents the outward leg of the journey and duty "0018" represents the return leg of the journey. Where space permits, the three-character international location code is shown (e.g. TLV for Tel Aviv, NYC for New York City) at respective ends of the block depicting each duty. On the other hand, where space does not permit, because the time-scale is too compact, the location code is suppressed from the display, although it is still defined. For example, the duty 19 comprises three flights "0009", "0010" and "0202" whose location codes are not shown owing to lack of space. Clicking. on the block representative of the duty 19 displays textual information specifying the flights, details of the crew, take off and landing locations, times and so on.

Following the duty "0017" is a rest period 20 depicted by a scaled bar of a different hue to that of the duties and crew-pairings. The flights also are color coded: the same color being used for flights belonging to the same carrier and different colors being used for flights belonging to the different carriers. By such means, the display shows to scale crew-pairings, duties, flights and rest periods and distinguishes between different carriers thus allowing data associated with the crew-pairings to be readily assimilated.

In order to allow the crew-pairings to be edited, it is necessary to provide a mechanism for changing duties associated with a crew-pairing and also to change flights associated with specific duties. It is not admissible to change directly a flight associated with a crew-pairing since only duties are associated directly with crew-pairings whilst flights themselves are associated directly with duties. To this end, flights are extracted from the database and edited in the low-level window 13 whilst duties are created and edited in the mid-level window 12 from flights displayed in the low-level window 13. This having been done, the duties in the mid-level window 12 can be transferred to the top-level window 11 so as to create a new crew-pairing or replace a duty in an existing crew-pairing.

Thus, in order to allow crew-pairings to be created and edited, a separate window must be provided for graphically displaying each level of the crew-pairings in the respective window in synchronized relationship on a common axis representative of the common dependency. In the general case where an object having N levels is to edited, then N windows must be provided: one for each level. Editing tools must be provided for allowing:

(i) objects of the same level to be interchanged, (ii) objects of a given level i (where i<N) to be inserted into an object of a higher level (i+1), and (iii) objects of a given level i (where i>1) to be disassembled into an object of a lower level (i–1).

With reference to FIGS. 2 to 6 of the drawings, there will now be described the principal events associated with the flight, duty and crew-pairing objects in the Gantt Chart shown in FIG. 1.

Figure 2:
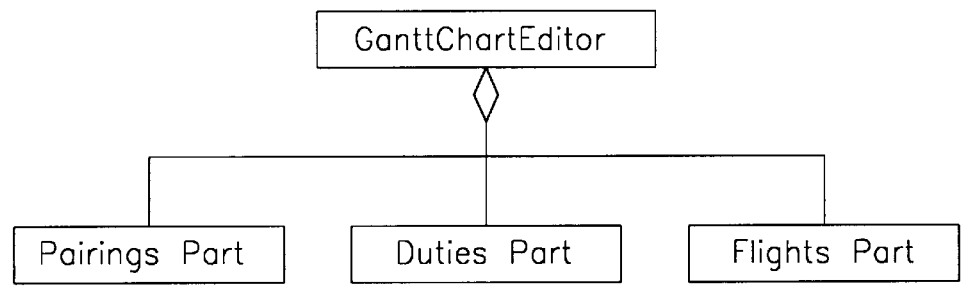
FIG. 2 is a schematic diagram showing the functional relationship between the different editing windows depicted in FIG. 1.

FIG. 2 shows the object hierarchy associated with the Gantt Chart Pairing Group Editor. This window is opened from the Crew Pairing System window; it does not allow interaction with its parent window when it is opened (modal window).

Main functions

The window is divided into three Gantt Chart areas: pairing, open duties, transfer flights.

Each can be resized at the expense of its neighbor using the left mouse button to drag the border between two parts. The cursor changes its form when it points to the border. The Gantt Chart areas are scrollable horizontally and vertically. The horizontal scrolling can be synchronized between all three parts or independently for each of them. Gantt chart areas contain pairing, duty and flight objects displayed as colored rectangles. The duty and flight objects can be selected, moved by drag/drop from one pairing/duty object to another.

The objects are color-coded according to their type or state. For flights there are the following states: fleet type; operating/transfer; valid/invalid. For duties, there is simulator or regular state. The minimum duty rest time is also displayed at the end of each duty within a pairing.

Each line of the Gantt chart area is also an object (pairing, open duty, transfer flight) whose name is displayed in the list on the left hand side of the area. The names can be selected by the left mouse button and acted on using the pop up menu or corresponding menu bar item. All changes made by the user can be checked for legality using either the pop up menu or menu bar items; the optimizer functions are called for this purpose: this in itself not being a feature of the present invention.

Simple time overlap checks are done by the GUI automatically during drop or paste actions, Check results will be displayed in a message box.

There now follows a description of the mouse button actions on the Gantt Chart part area:
- click left button to select an object which is pointed (duty or flight).
  - The selected object can be Cut or Copied to the GUI clipboard using the Toolbar PB or Menu items and later it can be Pasted into another object.
- click middle button to drag an object which is pointed (duty or flight). The cursor is changed as the mouse moves and it shows a stop sign when the object drop is rejected,
  - On release this button, the object will be dropped if it is possible or the drag action will be canceled if the drop is rejected.
  - The GUI local time check is done during the dragging to avoid the overlapping of objects on the Gantt chart area.
- click right button to show a pop up menu.
  - The menu items are disabled/enabled according to the properties of the selected object. The menu has the same items as the Edit menu on the menu bar.

A specific application actually reduced to practice was implemented in SmallTalk object-oriented language, although it will be readily appreciated that any other suitable programming language can equally well be employed.

Figure 3:
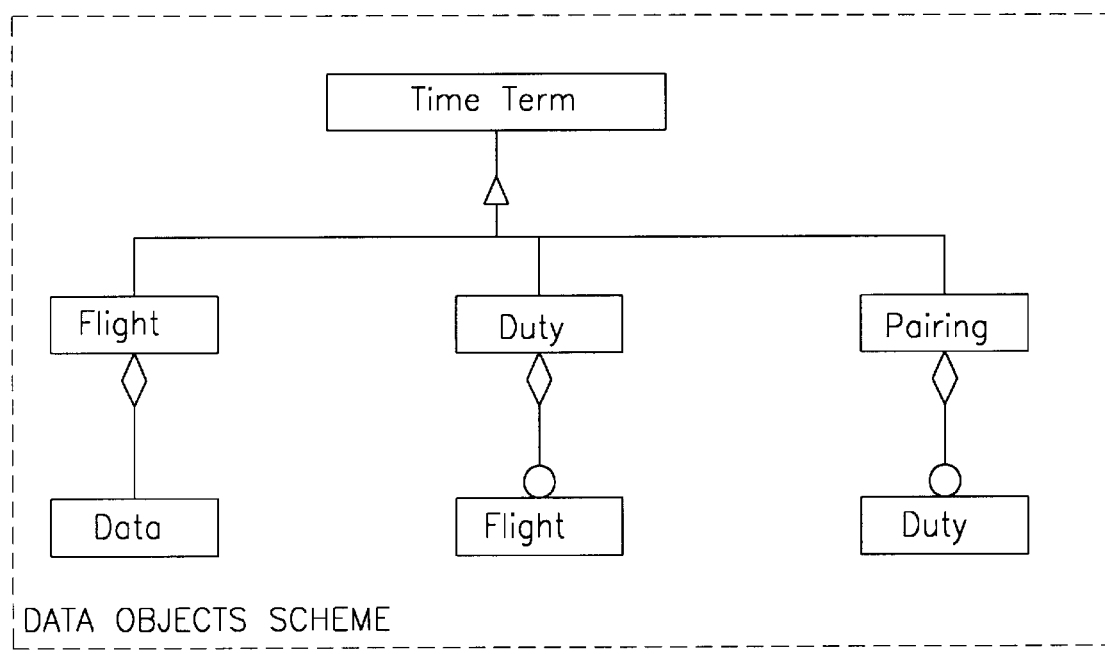
FIG. 3 is a schematic diagram showing the hierarchy of the data objects associated with the editing windows depicted in FIG. 1.

FIG. 3 shows the non-visual data objects scheme of the application design using the following notations:

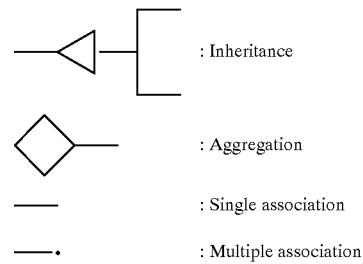

Figure 4:
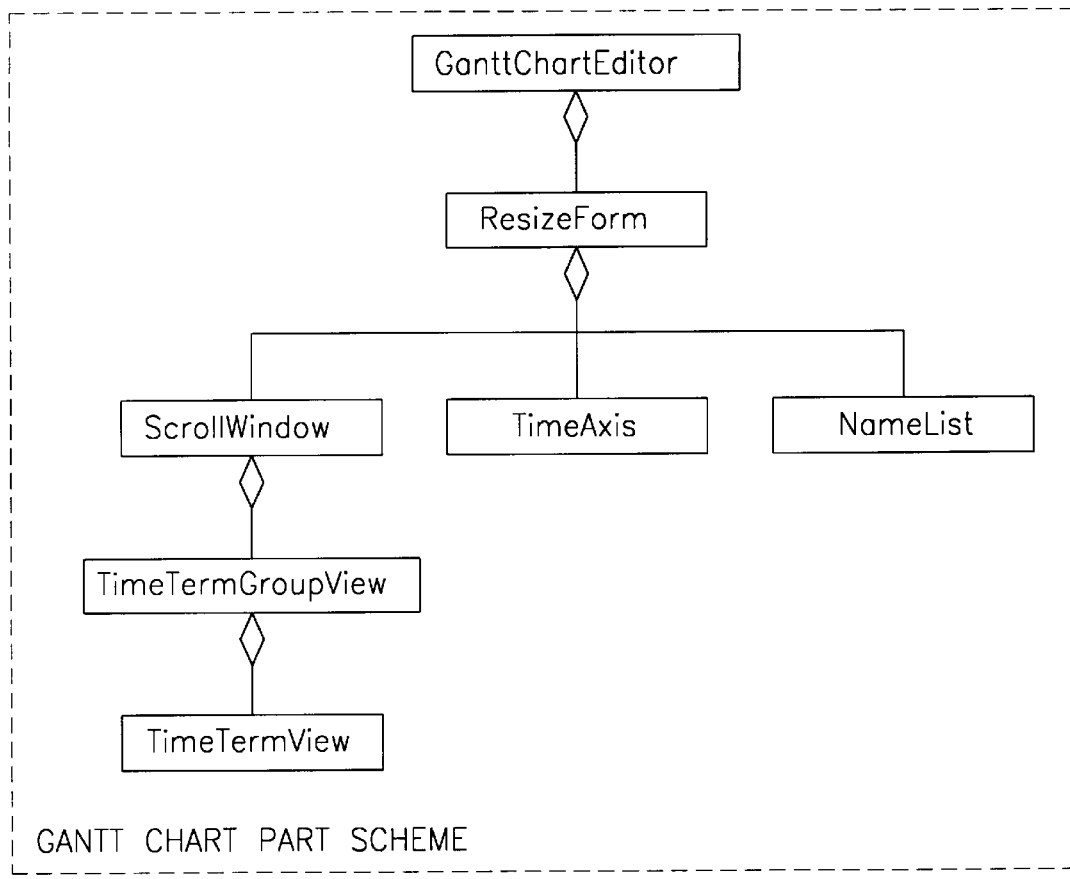
FIG. 4 is a schematic diagram of the Gantt Chart Part scheme associated with the editing windows depicted in FIG. 1.

— : Inheritance
— : Aggregation
— : Single association
—• : Multiple association Application Non-Visual Objects
  TimeTerm presents a basic abstract non-visual object for a time slot data.
    attributes: name; startTime; finishTime;
  Flight (subclass of TermTime)
    attributes: flight type; flight number; departure station; arrival station;
  Duty (subclass of TermTime)
    attributes: list of flights
  pairing (subclass of TermTime)
    attributes; list of duties FIG. 4 is a partial schematic diagram of the visual objects in the Gantt Chart shown in FIG. 2:

Application Visual Objects
  ResizeForm—allows resizing by dragging a bottom line
  EnhancedScrollWindow—allows synchronization in scrolling between several windows.
  TimeAxisView—shows Gantt Chart time ruler which can be zoomed
  TimeTermView (subclass of FormView)—shows a single colored time slot object
    attributes: data; parent; startTime; finishTime; color; vertSize; horzSize
  TimeTermGroupView (subclass of FormView)—shows a set of lines with time slot objects
    attributes: dataList; startTime; finishTime; vSize; hSize;
  EnhancedNameList (subclass of ScrollableList)
    attributes: nameList; itemheight
  GanttChartPart
    attributes: starttime; finishTime; vertSize; horzSize;
    subparts: ResizeForm; TimeAxisView; NameList; EnhancedScrollwindow; TimeTermGroupView (workview for EnhancedScrollWindow)

Figure 5:
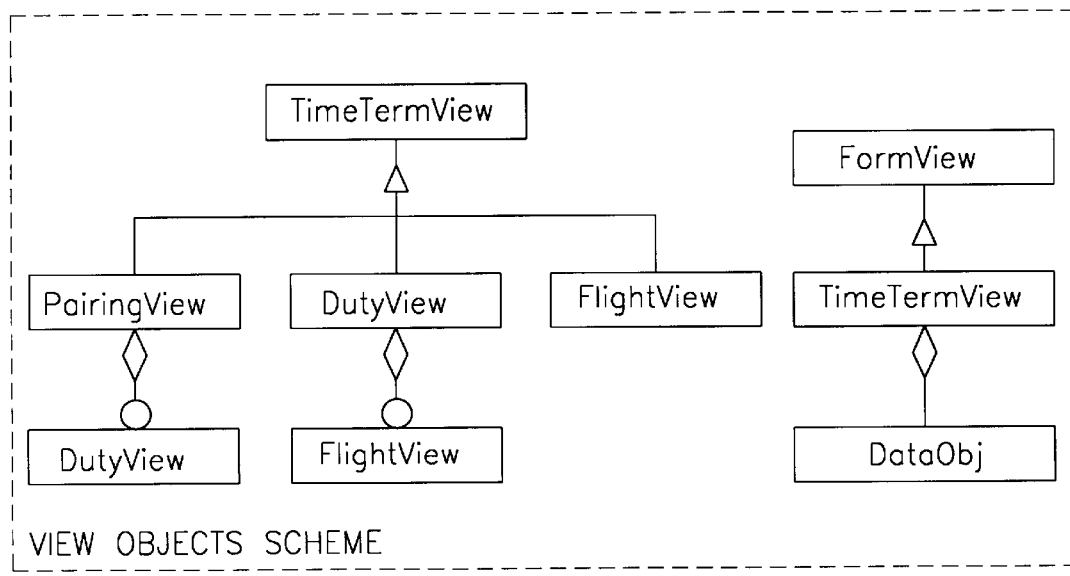
FIG. 5 is a schematic diagram of special visual objects associated with the editing windows depicted in FIG. 1.

FIG. 5 is a schematic diagram of special visual objects associated with the editing windows depicted FIG. 1, comprising the following objects:
  FlightView (subclass of TimeTermView; data: Flight)
  TransferFlightView (subclass of TimeTermView; data: Flight) (on drag: COPY only)
  DutyView (subclass of TimeTermView; data: Duty)
  Dutyestview (subclass of TimeTermView data: TimeTerm) (no drag)
  PairingView (subclass of TimeTermView; data: Pairing)
  PairingGroupView (subclass of TimeTermGroupView; dataList: PairingList)
  DutyGroupView (subclass of TimeTermaGroupView; dataList: OpenDutyList)
  FlightGroupView (subclass of TimeTermGroupView; dataList: TransferFlightList)

Figure 6:
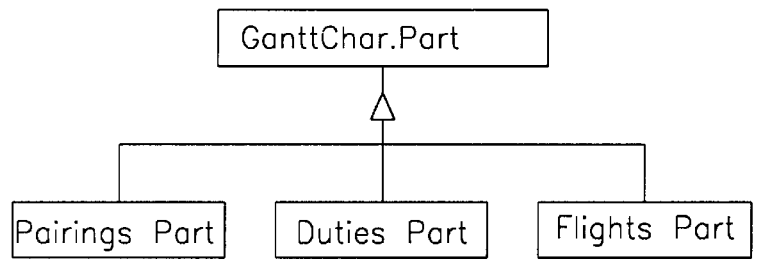
FIG. 6 is a schematic diagram of the objects associated with the Gantt Chart editing windows depicted in FIG. 1.

Finally, FIG. 6 shows the object hierarchy associated with the GanttChartPart, comprising the following objects:

FlightGroupPart (subclass of GanttChartPart; workView: FlightGroupView)

DutyGroupPart (subclass of GanttChartPart; workView: DutyGroupView)

PairingGroupPart (subclass of GanttChartPart; workview: PairingGroupView).

Figure 7:
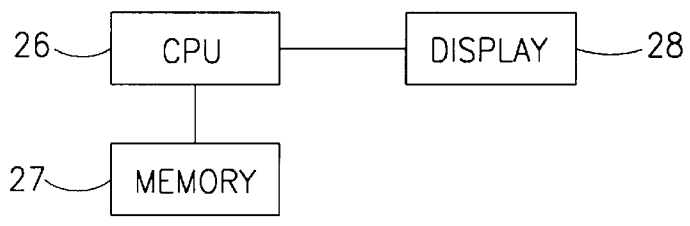
FIGS. 7 and 8 are block diagrams showing functionally the principal components in a system for displaying and editing a multi-level Gantt Chart according to the invention.
Figure 8:
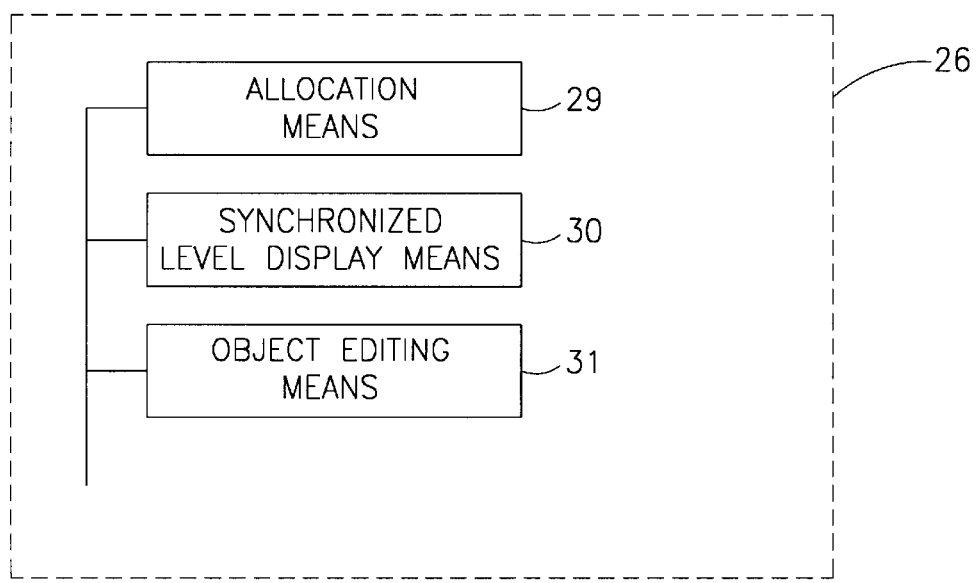

(a) Reference is now made to FIGS. 7 and 8 of the drawings showing functionally details of a system depicted generally as 25 comprising a CPU 26 (constituting a processor) having coupled thereto a memory 27 and a display device 28. The memory 27 includes a disk for storing therein a database relating to carrier data, flights, personnel, tariffs, mandatory rest periods and other relevant data. The memory 27 also stores a program in accordance with which the CPU 26 operates according to the method described in detail above with reference to FIGS. 1 to 6 of the drawings, Conceptually, the CPU 26 may be considered to comprise an allocation means 29 for allocating different non-overlapping areas of the display device 28 for each level of the resource schedules. The CPU 26 further includes synchronized level display means designated 30 which are responsive to the object data in the three levels for displaying each level of the resource schedule in the respective area of the display device 28 on a common time axis.

Object editing means 31 are provided for allowing:
(i) objects of the same level to be interchanged,
(ii) objects of a given level i (where i<N) to be inserted into an object of a higher level (i+1), and
(iii) objects of a given level i (where i>1) to be disassembled into an object of a lower level (i−1)

The object editing means 31 are standard tools which are well-known in GUIs and need not therefore be described in further detail, In the method claims which follow, alphabetic characters used to designate claim steps are provided for convenience only and do not imply any particular order of performing the steps.

What is claimed is:

1. For use with a computer having a processor and display device coupled thereto, a method for displaying a resource schedule containing a plurality of objects in an N-level multiple hierarchy all of which objects are subject to a common dependency, comprising the steps of:
   (a) allocating different non-overlapping areas of the display device for each level of the resource schedules,
   (b) graphically displaying each level of the resource schedule in the respective area of the display device on a common axis representative of the common dependency,
   (c) providing editing tools for allowing:
      (i) objects of the same level to be interchanged,
      (ii) objects of a given level i (where i<N) to be inserted into an object of a higher level (i+1), and (iii) objects of a given level i (where i>1) to be disassembled into an object of a lower level (i−1).

2. The method according to claim 1, wherein said levels are displayed in mutually synchronized relationship.

3. The method according to claim 1, wherein said levels are graphically encoded so as to indicate visibly respective component levels in an object.

4. The method according to claim 3, wherein said step of graphically encoding includes color-coding the component levels of the object.

5. The method according to claim 1, further including the step of displaying a ruler representative of the common axis and calibrated to indicate a mutual interrelationship of two or more objects at any level relative to the common axis.

6. The method according to claim 2, further including the step of displaying a scroll bar common to each of said areas for allowing the respective objects in each area to be synchronously scrolled relative to the common axis.

7. The method according to claim 1, wherein at least two objects in the highest level (N) are paired indicating that resources are common to both objects.

8. The method according to claim 7, wherein a new object may be inserted into the highest level (N by creating a new object in the next highest level (N−1) and moving the new object to the highest level (N).

9. The method according to claim 1, wherein textual descriptors are associated with each object and data representative of the textual descriptors are displayed in spaced relationship to the respective object.

10. The method according to claim 9, wherein the textual descriptors are abbreviations.

11. The method according to claim 10, wherein an object may be selected and its abbreviated textual descriptors expanded so as to allow the complete descriptor to be displayed.

12. The method according to claim 1, wherein the objects are time-dependent and the common axis is representative of elapsed time.

13. The method according to claim 12 for displaying a flight schedule, wherein the objects include crew pairings each containing one outward and one return duty, duties each containing one or more flights with no intervening rest period, and flights which are displayed respectively in a top level, a middle level and a low level window.

14. The method according to claim 13, wherein there is further displayed a rest period following each duty.

15. The method according to claim 13, wherein:
   the outward and return duties in each crew pairing are linked by a boundary having a first color,
   the flights within each duty are linked by a boundary having a second color, and
   each flight is color coded with a third color.

16. The method according to claim 15, wherein flights belonging to different carriers are color-coded differently.

17. The method according to claim 13, wherein alongside each window is displayed a legend describing the objects in the respective window.

18. The method according to claim 13, wherein abbreviated flight data is displayed together with the respective flights in each duty.

19. The method according to claim 18, wherein an object may be selected for displaying complete flight data associated with therewith.

20. The method according to claim 18, wherein a duty may be selected for displaying complete flight and crew data associated with each flight thereof.

21. The method according to claim 13, further including providing controls for processing the crew pairings in the top level window so as to construct a resource schedule for a specified time period and for a specified carrier or carriers.

22. The method according to claim 13, wherein the crew-pairings, duties and flights are displayed in mutually synchronized relationship.

23. A system having a processor coupled to a memory and a display device for displaying a resource schedule containing a plurality of objects in an N-level multiple hierarchy all of which objects are subject to a common dependency, said processor comprising:
   (a) means for allocating different non-overlapping areas of the display device for each level of the resource schedules, (b) means for graphically displaying each level of the resource schedule in the respective area of the display device on a common axis representative of the common dependency, and (c) editing tools for allowing:
   (i) objects of the same level to be interchanged,
   (ii) objects of a given level i (where i<N) to be inserted into an object of a higher level (i−1), and
   (iii) objects of a given level i (Where i>1) to be disassembled into an object of a lower level (i 1).

24. The system according to claim 23, wherein said processor includes synchronizing means for displaying the levels in mutually synchronized relationship.

25. The system according to claim 23, wherein said processor includes encoding means for graphically encoding the different levels so as to indicate visibly respective component levels in an object.

26. The system according to claim 25, wherein the encoding means includes means for color-coding the component levels of the object.

27. The system according to claim 23, wherein said processor further includes means for displaying a ruler representative of the common axis and calibrated to indicate a mutual interrelationship of two or more objects at any level relative to the common axis.

28. The system according to claim 24, wherein said processor further includes means for displaying a scroll bar common to each of said areas for allowing the respective objects in each area to be synchronously scrolled relative to the common axis.

29. The system according to claim 23, further including means for pairing at least two objects in the highest level (N) thereby indicating that resources are common to both objects.

30. The system according to claim 29, wherein said processor includes means for creating a new object in a level (N−1) below the highest level (N) and means for moving the new object from the level (N−1) to the highest level (N).

31. The system according to claim 23, wherein the processor includes;
   means for associating textual descriptors with each object, and
   means for displaying on the display device data representative of the textual descriptors in spaced relationship to the respective object.

32. The system according to claim 31, wherein the textual descriptors are abbreviations and further including selection means for selecting an object and expanding its abbreviated textual descriptors expanded so as to allow the complete descriptor to be displayed.

33. The system according to claim 23, wherein the objects are time-dependent and the common axis is representative of elapsed time.

34. The system according to claim 33 for displaying a flight schedule, wherein the objects include crew pairings each containing, one outward and one return duty, duties each containing one or more flights with no intervening rest period, and flights which are displayed respectively in a top level, a middle level and a low level window.

35. The system according to claim 34, wherein;
   the outward and return duties in each crew pairing are linked by a boundary having a first color,
   the flights within each duty are linked by a boundary having a second color, and
   each flight is color coded with a third color.

36. The system according to claim 35, wherein flights belonging to different carriers are color-coded differently.

37. The system according to claim 34, wherein alongside each window is displayed a legend describing the objects in the respective window.

38. The system according to claim 34, wherein abbreviated flight data is displayed together with the respective flights in each duty.

39. The system according to claim 38, wherein an object may be selected for displaying complete flight data associated with therewith.

40. The system according to claim 38, wherein a duty may be selected for displaying complete flight and crew data associated with each flight thereof.

41. The system according to claim 34, further including controls for processing the crew pairings in the top level window so as to construct a resource schedule for a specified time period and for a specified carrier or carriers.

42. The system according to claim 34, wherein processor includes means for displaying the crew-pairings, duties and flights in mutually synchronized relationship.

* * * * *